US012591390B2

(12) United States Patent
Shin et al.

(10) Patent No.: US 12,591,390 B2
(45) Date of Patent: Mar. 31, 2026

(54) APPARATUS AND METHOD FOR PROCESSING READ COMMAND IN ZONED NAMESPACE BASED ON DETERIORATION STATE OF MEMORY DEVICE

(71) Applicant: SK hynix Inc., Gyeonggi-do (KR)

(72) Inventors: Hee Chan Shin, Gyeonggi-do (KR); Bo Kyeong Kim, Gyeonggi-do (KR); Yu Jung Lee, Gyeonggi-do (KR); Han Sol Rhee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 323 days.

(21) Appl. No.: 18/325,128

(22) Filed: May 30, 2023

(65) Prior Publication Data

US 2024/0211174 A1     Jun. 27, 2024

(30) Foreign Application Priority Data

Dec. 23, 2022     (KR) ........................ 10-2022-0183381

(51) Int. Cl.
*G06F 3/06* (2006.01)

(52) U.S. Cl.
CPC .......... *G06F 3/0659* (2013.01); *G06F 3/0604* (2013.01); *G06F 3/0647* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 2018/0196622 | A1* | 7/2018 | Oshimi | G06F 11/3037 |
| 2021/0004180 | A1* | 1/2021 | Lee | G06F 11/2094 |
| 2021/0141532 | A1* | 5/2021 | Byun | G06F 3/0647 |
| 2022/0100405 | A1* | 3/2022 | Lee | G06F 3/0688 |
| 2022/0229594 | A1* | 7/2022 | Na | G06F 3/0673 |
| 2022/0391140 | A1* | 12/2022 | Lee | G06F 3/0604 |
| 2023/0342290 | A1* | 10/2023 | Tumanova | G06F 12/0246 |

FOREIGN PATENT DOCUMENTS

KR     10-2022-0060372 A     5/2022

* cited by examiner

*Primary Examiner* — Rocio Del Mar Perez-Velez
*Assistant Examiner* — Marwan Ayash
(74) *Attorney, Agent, or Firm* — IP & T GROUP LLP

(57)     ABSTRACT

The present technology provides a memory system, including a memory device including a plurality of memory blocks that have been allocated to a plurality of zoned namespaces (ZNSs), and a controller configured to, when a ZNS on which a read command that has been received from a host is to be performed is a target for a background operation in which a data migration occurs, store the read command in a delay queue, calculate a delay time for each of the read commands that have been stored in the delay queue for each preset calculation time cycle, and process the read commands by sequentially outputting the read commands from the delay queue after a delay of the calculated delay time.

19 Claims, 8 Drawing Sheets

FIG. 8

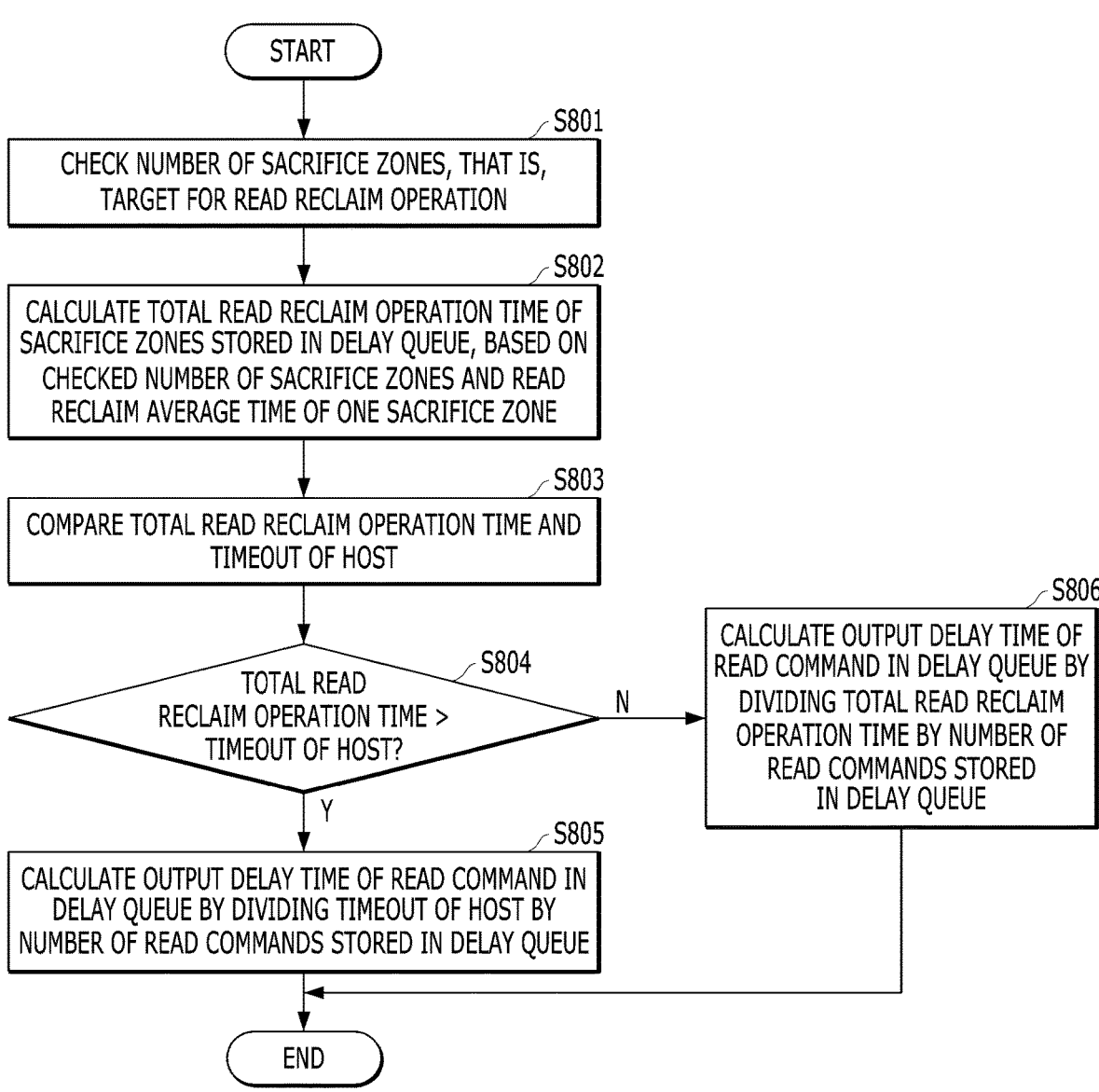

START

S801
CHECK NUMBER OF SACRIFICE ZONES, THAT IS,
TARGET FOR READ RECLAIM OPERATION

S802
CALCULATE TOTAL READ RECLAIM OPERATION TIME OF
SACRIFICE ZONES STORED IN DELAY QUEUE, BASED ON
CHECKED NUMBER OF SACRIFICE ZONES AND READ
RECLAIM AVERAGE TIME OF ONE SACRIFICE ZONE

S803
COMPARE TOTAL READ RECLAIM OPERATION TIME AND
TIMEOUT OF HOST

S804
TOTAL READ
RECLAIM OPERATION TIME >
TIMEOUT OF HOST?

N

S806
CALCULATE OUTPUT DELAY TIME OF
READ COMMAND IN DELAY QUEUE BY
DIVIDING TOTAL READ RECLAIM
OPERATION TIME BY NUMBER OF
READ COMMANDS STORED
IN DELAY QUEUE

Y

S805
CALCULATE OUTPUT DELAY TIME OF READ COMMAND IN
DELAY QUEUE BY DIVIDING TIMEOUT OF HOST BY
NUMBER OF READ COMMANDS STORED IN DELAY QUEUE

END

APPARATUS AND METHOD FOR PROCESSING READ COMMAND IN ZONED NAMESPACE BASED ON DETERIORATION STATE OF MEMORY DEVICE

CROSS-REFERENCE TO RELATED APPLICATION

This application claims priority under 35 U.S.C. § 119 to Korean Patent Application No. 10-2022-0183381 filed on Dec. 23, 2022, which is incorporated herein by reference in its entirety.

BACKGROUND

1. Field

Embodiments of the present disclosure relate to a memory system and, particularly, to an apparatus and method for processing a read command based on a deterioration state of a memory device.

2. Discussion of the Related Art

A memory system is an apparatus that stores data according to a request from a host, such as a computer, a mobile terminal (e.g., a smartphone and a tablet), or various electronic devices. The memory system may further include a controller for controlling a memory device (e.g., a volatile/nonvolatile memory device). The controller may receive a command from the host, and may execute or control operations for reading, writing, or erasing data with respect to the memory device that is included in the memory system, in response to the received command. Furthermore, a memory system that supports a namespace function is recently being used so that the host can efficiently use the memory system. If the namespace function is used, the host may partition a memory device within the memory system, which is implemented as one physical device, in accordance with a plurality of logical partitions (i.e., a namespace). Accordingly, the host can manage data based on the namespace.

SUMMARY

Various embodiments of the present disclosure are directed to an apparatus and a method for processing a read command based on a deterioration state of a memory device.

These technical objectives obtainable from the present disclosure are not limited to those described herein, and other technical objectives not described herein will be apparently understood by those skilled in the art, to which the present disclosure pertains, from the following description.

In an embodiment of the present disclosure, a memory system comprising: a memory device comprising a plurality of memory blocks that have been allocated to a plurality of zoned namespaces (ZNSs); and a controller configured to, when a ZNS on which a read command that has been received from a host is to be performed is a target for a background operation in which a data migration occurs, store the read command in a delay queue, to calculate a delay time of each of the read commands that have been stored in the delay queue for each preset calculation time cycle, and to process the read commands by sequentially outputting the read commands from the delay queue after a delay of the calculated delay time.

In an embodiment of the present disclosure, an operating method of a memory system, comprising: receiving a read command from a host; checking a zoned namespace (ZNS) corresponding to a read operation in response to the received read command; checking whether the checked ZNS is a sacrifice ZNS that is a target for a background operation; storing the read command in a delay queue if the ZNS is the sacrifice ZNS that is the target for the background operation; calculating a delay time of each of the read commands that have been stored in the delay queue for each preset calculation time; and processing the read command after delaying the read command based on the calculated delay time.

In an embodiment of the present disclosure, a memory system comprising: a memory device including a plurality of memory blocks allocated to a plurality of zoned namespaces (ZNSs); and a controller configured to: receive a read command from a host; check a zoned namespace (ZNS) corresponding to a read operation in response to the received read command; check whether the checked ZNS is a sacrifice ZNS corresponding to a target for a background operation; store the read command in a delay queue when the ZNS is the sacrifice ZNS; calculate a delay time of each of the read commands stored in the delay queue for each preset calculation time; and process the read command after delaying the read command based on the calculated delay time.

Aspects of the present disclosure are merely some embodiments of the present disclosure. Various embodiments into which technical characteristics of the present disclosure have been incorporated may be derived and understood based on the detailed description of the present disclosure by a person having ordinary knowledge in the art.

According to the present technology, when deterioration occurs in any memory block or zone, among a plurality of memory blocks or a plurality of zones within the memory device, due to repetitive read operations, a temporal margin, that is needed when valid data that has been stored in the memory block or zone in which the deterioration has occurred, is migrated to an empty memory block or an empty zone can be secured.

Furthermore, according to an embodiment of the present disclosure, the memory system can protect a memory block from deteriorating until a migration operation is performed when a deterioration numerical value of the memory block, among a plurality of memory blocks, reaches a given level or higher.

Effects of the present disclosure which may be obtained in the present disclosure are not limited to the aforementioned effects, and other effects not described above may be evidently understood by a person having ordinary knowledge in the art to which the present disclosure pertains from the following description.

BRIEF DESCRIPTION OF THE DRAWINGS

FIGS. 5 to 9 are flowcharts for describing operations of the controller according to an embodiment of the present disclosure.

DETAILED DESCRIPTION

Hereinafter, various embodiments of the present disclosure will be described in detail with reference to the accompanying drawings. In the following description, it is to be noted that only a part necessary to understand an operation according to an embodiment of the present disclosure is described and descriptions of the other parts will be omitted in order not to obscure the subject matter of the present disclosure.

Figure 1:
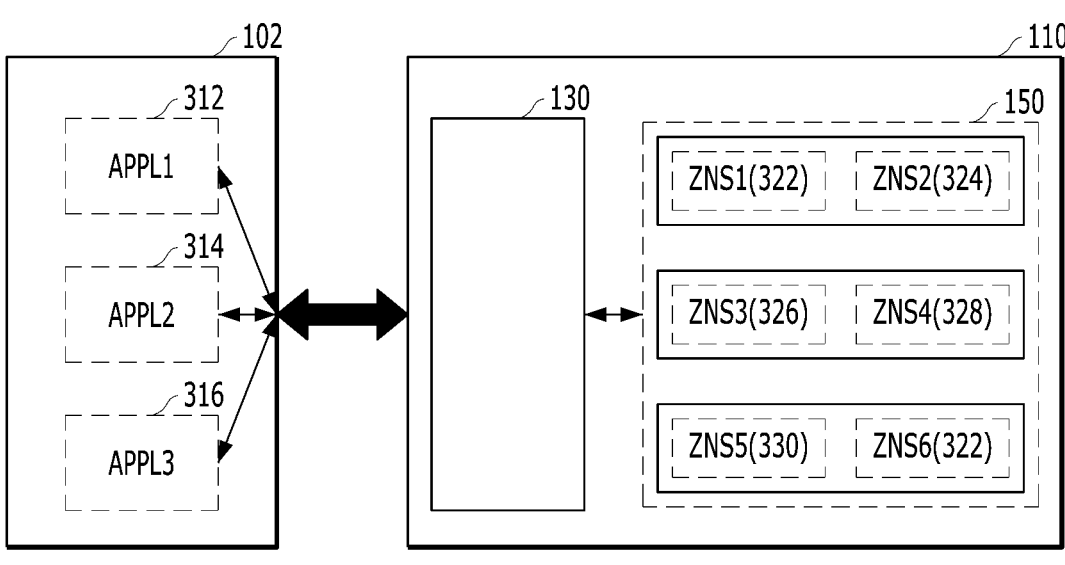
FIG. 1 is a diagram illustrating a memory system according to an embodiment of the present disclosure.

FIG. 1 is a diagram illustrating a memory system 100 according to an embodiment of the present disclosure.

Referring to FIG. 1, the memory system 110 may include a memory device 150 and a controller 130. The memory device 150 and the controller 130 within the memory system 110 may be components that are physically divided. The memory device 150 and the controller 130 may be connected through at least one data path. For example, the data path may consist of a channel and/or a way.

According to an embodiment, the memory device 150 and the controller 130 may be components that are functionally divided. Furthermore, according to an embodiment, the memory device 150 and the controller 130 may be implemented through one chip or a plurality of chips.

The memory device 150 may include a plurality of memory blocks. The memory block may be understood as a unit of nonvolatile memory cells from which data is erased together through an erase operation. Although not illustrated, the memory block may include a page, that is, a unit of nonvolatile memory cells in which data is stored together through a program operation or from which data is output together through a read operation. For example, one memory block may include a plurality of pages.

Although not illustrated, the memory device 150 may include a plurality of memory planes or a plurality of memory dies. According to an embodiment, the memory plane may include at least one memory block, and may be understood as a logical or physical partition that includes a driving circuit capable of controlling an array including a plurality of nonvolatile memory cells and a buffer capable of temporarily storing data that is input to or output from the plurality of nonvolatile memory cells.

Furthermore, according to an embodiment, the memory die may include at least one memory plane, and may be understood as a set of components that are implemented on a substrate and may be physically divided. Each memory die may be connected to the controller 130 through a data path, and may include an interface for receiving/transmitting data and signals from/to the controller 130.

According to an embodiment, the memory device 150 may include at least one memory block, at least one memory plane, or at least one memory die. The memory device 150 that has been described with reference to FIG. 1 may include different internal components in accordance with operation performance of the memory system 110. An embodiment of the present disclosure may not be limited to the internal components described with reference to FIG. 1.

The memory device 150 may include a voltage supply circuit capable of supplying at least one voltage to a memory block. The voltage supply circuit may supply a read voltage (Vrd), a program voltage (Vprog), a pass voltage (Vpass), or an erase voltage (Vers) to a nonvolatile memory cell included in the memory block. For example, during a read operation for reading data that has been stored in a nonvolatile memory cell included in the memory block, the voltage supply circuit may supply the read voltage to a selected nonvolatile memory cell. During a program operation for storing data in a nonvolatile memory cell included in the memory block, the voltage supply circuit may supply the program voltage to a selected nonvolatile memory cell. Furthermore, during a read operation or program operation for a selected nonvolatile memory cell, the voltage supply circuit may supply the pass voltage to an unselected nonvolatile memory cell. During an erase operation for erasing data that has been stored in a nonvolatile memory cell included in the memory block, the voltage supply circuit may supply the erase voltage to the memory block.

The memory device 150 may store information with regard to various voltages that are supplied to a memory block. For example, if a nonvolatile memory cell within a memory block is capable of storing multi-bit data, the levels of the read voltages for identifying the multi-bit data may be various. The memory device 150 may include a voltage table that includes the levels of a plurality of read voltages corresponding to the multi-bit data.

At least some of a plurality of memory blocks included in the memory device 150 may be allocated to a namespace that is divided in a zone unit (hereinafter, referred to as a zoned namespace, ZNS). According to an embodiment, the controller 130 may equally allocate all of the memory blocks included in the memory device 150 to a plurality of ZNSs. In this case, the plurality of memory blocks that have been allocated to the ZNSs may include a memory block in which data has been stored and a free memory block in which data has not been stored.

Furthermore, according to an embodiment, the controller 130 may allocate only some memory blocks corresponding to a storage space for each ZNS, among all memory blocks included in the memory device 150, to a ZNS. If the allocation of a memory block is released according to garbage collection, some of the memory blocks included in the memory device 150 may maintain the state in which some of the memory blocks may not be allocated to any ZNS. The controller 130 may additionally allocate, to a ZNS, a memory block that has not been allocated, as occasion demands, in response to a request from an external device (e.g., a host) or in a process of performing an input/output operation.

The ZNS indicates a namespace that is divided and used in a zone unit. In this case, the namespace may mean a storage space of a nonvolatile memory device which may be formatted into a logical block. In the memory system 110 to which the ZNS has been applied, a data input/output operation may be performed differently from that of a general nonvolatile memory system.

For example, when a plurality of applications 312 (APPL1), 314 (APPL2), and 316 (APPL3) are performed in a host 102 and the plurality of applications APPL1, APPL2, and APPL3 generate data and store the generated data in the memory system 110. First, in a general nonvolatile memory system, data that is input from the host 102 that has been connected to the general nonvolatile memory system is sequentially stored in a memory device of the general nonvolatile memory system. That is, the data that is generated by the plurality of applications APPL1, APPL2, and APPL3 may be sequentially stored in the memory device without division in the order that the data has been transferred from the host 102 to the memory system 110. Data that has been generated by the plurality of applications APPL1, APPL2, and APPL3 may be mixed and stored in an open memory block into which data will be programmed. In this process, the controller may generate map data which may connect a logical address that has been received from the host 102 and a physical address indicative of a location of the memory device at which data has been stored. Thereafter, when the plurality of applications APPL1, APPL2, and APPL3 of the host 102 request data that has been stored in the memory system, the controller may output the data that has been requested by the plurality of applications APPL1, APPL2, and APPL3, based on the map data.

In a general nonvolatile memory system, various types of data items or data items that have been generated by several applications may be mixed and stored in one memory block. In this case, the validities (recent data) of the data that has been stored in the memory block may be different from each other, and it may be difficult to predict the validities of the data. For this reason, if garbage collection is performed, many resources may be consumed to extract valid data and to identify whether data is valid. Furthermore, applications that are related to one memory block may be plural. Therefore, if garbage collection is performed on the one memory block, the input/output operation of data that is used by a plurality of corresponding applications may be delayed. However, the ZNS can resolve an issue in the aforementioned general nonvolatile memory system.

The plurality of applications APPL1, APPL2, and APPL3 that are performed in the host 102 may sequentially store their data in predetermined zones of the ZNS, respectively. In this case, the zone may include a certain space in a logical addressing system that is used by the host 102 and some of a plurality of memory blocks included in the memory device 150. According to an embodiment, different ZNSs may be allocated to each of the plurality of applications APPL1, APPL2, and APPL3. In another embodiment, each of the plurality of applications APPL1, APPL2, and APPL3 may also use a specific ZNS. In still another embodiment, two or more ZNSs may be allocated to each of the plurality of applications APPL1, APPL2, and APPL3. Each of the plurality of applications APPL1, APPL2, and APPL3 may use the allocated ZNSs in accordance with characteristics of data to be stored in the memory system 110. A zone that has been requested by the plurality of applications APPL1, APPL2, and APPL3 in a logical addressing system may be previously allocated to each of a plurality of ZNSs 322, 324, 326, 328, 330, and 332. Each of the plurality of applications APPL1, APPL2, and APPL3 may not use a ZNS that has not been allocated to each application. That is, a logical address that has been previously allocated to a specific ZNS may not be used by another application that uses another ZNS. Accordingly, in the nonvolatile memory device, data that has been generated by several applications can be avoided from being mixed and stored in a memory block.

In an embodiment of the present disclosure, a case in which two or more ZNSs are allocated to each of the plurality of applications APPL1, APPL2, and APPL3 that are performed in the host 102 is described as an example. Referring to FIG. 1, the plurality of ZNSs ZNS1 to ZNS6 corresponding to the plurality of applications APPL1, APPL2, and APPL3 are included in the memory device 150. For example, the first application APPL1 may use the first ZNS 322 (ZNS1) and the second ZNS 324 (ZNS2). The second application APPL2 may use the third ZNS 326 (ZNS3) and the fourth ZNS 328 (ZNS4). The third application APPL3 may use the fifth ZNS 330 (ZNS5) and the sixth ZNS 332 (ZNS 6).

In this case, since data that has been generated by the first application APPL1 is sequentially stored in a memory block included in the first ZNS ZNS1, there is no need to check a memory block included in another ZNS in order to identify valid data. Furthermore, the plurality of ZNSs 322, 324, 326, 328, 330, and 332 each may be units for an erase operation. There is no need to perform garbage collection on a memory block that has been allocated to the first ZNS ZNS1 and the second ZNS ZNS2 until a storage space for the first ZNS ZNS1 and the second ZNS ZNS2 that have been allocated to the first application APPL1 becomes insufficient. Accordingly, efficiency of garbage collection for the memory device 150 can be increased, and frequency of the garbage collection can be lowered. This may result in a reduction in a write amplification factor (WAF) indicative of the degree to which the amount of writing is amplified in the memory device 150, and can increase the lifespan of the memory device 150. Furthermore, in the memory system 110 to which the ZNSs have been applied, overhead that occurs in the memory system 110 can be reduced, for example, media over-provisioning in the memory device 150 can be reduced, the usage rate of volatile memory 144 can be reduced, and the amount of data processed and transmitted/received can be reduced. Accordingly, performance of data input/output operations of the memory system 110 can be improved.

Furthermore, during an initial operation for enabling the host 102 and the memory system 110 to operate in conjunction with each other, the host 102 and the memory system 110 may communicate with information on the allocation of the ZNSs to the corresponding applications APPL1, APPL2, and APPL3. Data input/output operations may be performed in accordance with the ZNSs that have been determined as described above. During the data input/output operations, the host 102 may request the memory system 110 to operate with faster data input/output rates or request the memory system 110 to safely store data having a very high priority depending on characteristics of the data or characteristics of an application that is performed in the host 102.

The host 102 that drives a plurality of applications may transmit a read request to the controller 130 within the memory system 110 in order to read data that has been stored in a nonvolatile memory cell within a memory block that has been allocated to a ZNS. The controller 130 may perform a read operation on the memory block within the ZNS in response to the read request received from the host 102, and may then increase a read count corresponding to the ZNS. For example, when the host 102 transmits a read request in relation to the first ZNS ZNS1, the controller 130 may perform a read operation of reading data stored in a memory block that has been allocated to the first ZNS ZNS1, in response to the read request, and may increase a read count corresponding to the first ZNS. If any of the plurality of ZNSs is repeatedly read, an error bit may be increased due to an issue, such as read disturbance. Before an uncorrectable error occurs in the data stored in the memory block allocated to the ZNS, the controller 130 may perform a read reclaim operation of migrating, to another ZNS, the data stored in the ZNS. That is, the controller 130 may migrate the data stored in the ZNS to an empty ZNS in which no data has been stored, among the ZNSs that have been allocated to an application corresponding to the ZNS on which a read reclaim operation needs to be performed. Specifically, a read reclaim operation in a ZNS environment is described. The controller 130 may check a read count corresponding to each of the plurality of ZNSs, in a fixed read count check cycle. Furthermore, the controller 130 may detect, as a read claim target ZNS (hereinafter, referred to as a "sacrifice zone"), a ZNS of which an error bit increase rate, determined based on the number of error bits according to the checked read count, is a threshold or more. The controller 130 may upload information with regard to the designated sacrifice zone on a background list. Furthermore, an error bit increase rate determined based on experimental values may be used as a reference value of the error bit increase rate. The controller 130 may perform a migration operation of migrating data stored in the sacrifice zone to another free ZNS sequentially or according to determined priorities, based on the information with regard to the sacrifice zone uploaded on the background list. For example, if the first ZNS ZNS1, among the ZNSs, corresponds to a sacrifice zone, the controller 130 may perform a migration operation of migrating, to a second ZNS ZNS2 which is an empty ZNS, valid data stored in the first ZNS ZNS1.

In this case, the controller 130 may repeatedly receive, from the host 102, a read request corresponding to the sacrifice zone on which the migration operation is being performed or the migration operation has been scheduled to be performed. If the controller 130 performs a read operation on the sacrifice zone in response to the received read request, the read count of the sacrifice zone corresponding to the read request may continue to be increased, so that the sacrifice zone may further deteriorate and the migration operation may not be performed. In order to resolve such an issue, if the controller 130 does not perform the read request until the migration operation is finished in order to prevent the sacrifice zone corresponding to the read request from deteriorating, the controller 130 may not transmit, to the host 102, a response to the read request within the timeout of the host 102. Accordingly, in order to resolve the two issues, when receiving the read request from the host 102, the controller 130 may check whether a ZNS corresponding to the read request is the sacrifice zone. Furthermore, when the ZNS corresponding to the read request corresponds to the sacrifice zone, the controller 130 may store a corresponding read command in a delay queue in order to delay a processing operation for the read request. Furthermore, the controller 130 may calculate a delay time based on at least one of the timeout of the host 102, the number of sacrifice zones, a read reclaim average time of the sacrifice zone, and the number of read commands stored in the delay queue whenever an internal timer is driven according to a preset calculation time cycle. Then, the controller 130 may process the read request by sequentially outputting read commands from the delay queue based on the calculated delay times. Accordingly, the lifespan of the memory device 150 may be further increased, and data corresponding to the read request can be transferred to the host 102 within the timeout of the host 102. This is specifically described with reference to FIGS. 2 to 9.

Figure 2:
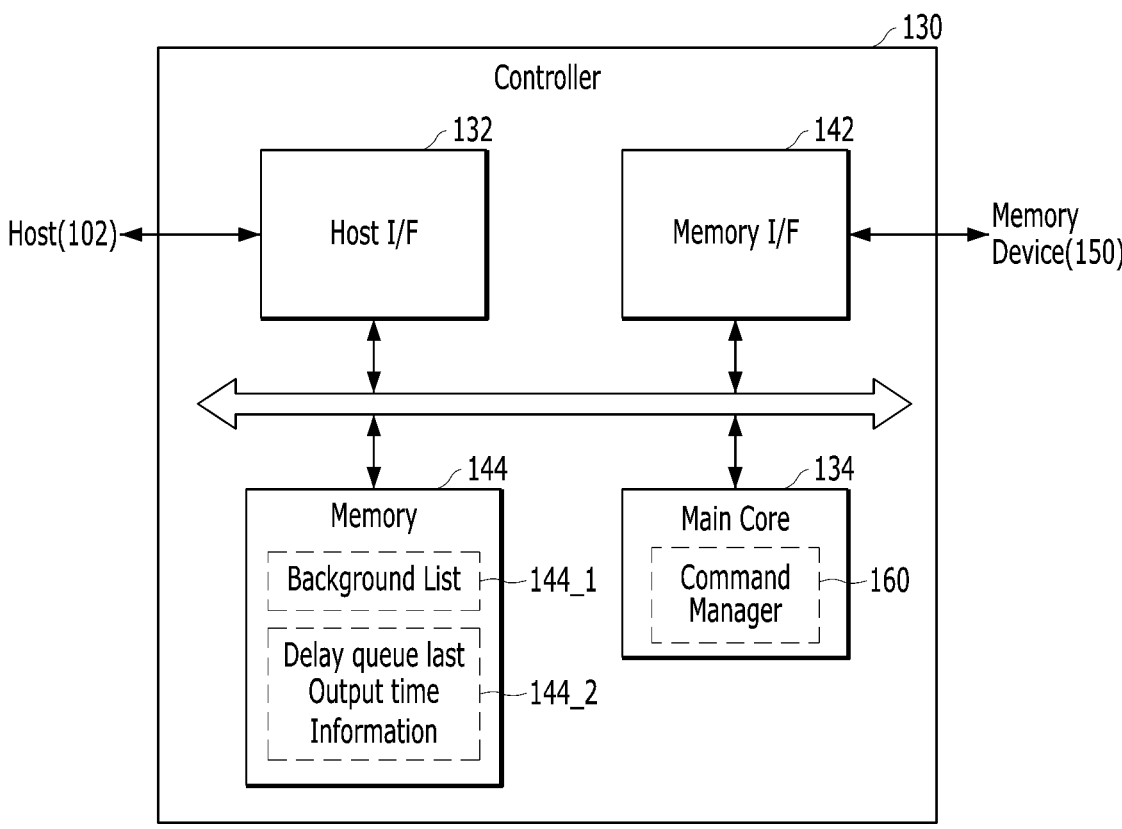
FIG. 2 is a detailed diagram of a controller shown in FIG. 1.

FIG. 2 is a detailed diagram of the controller 130 shown in FIG. 1.

Referring to FIG. 2, the controller 130 may include a host interface (host I/F) 132, a main core 134, a memory interface (memory I/F) 142, and a memory 144 which are connected to operate through an internal bus.

The host I/F 132 may process a command and data received from the host 102, and may communicate with the host 102 through at least one of various interface protocols or standards, such as a universal serial bus (USB), a multimedia card (MMC), peripheral component interconnect express (PCI-E), a serial attached SCSI (SAS), serial advanced technology attachment (SATA), parallel ATA (PATA), a small computer system interface (SCSI), an enhanced small disk interface (ESDI), integrated drive electronics (IDE), and a mobile industry processor interface (MIPI).

The host I/F 132 may receive a request, an instruction, and data from the host 102, and may be implemented or driven through firmware referred to as a host interface layer (HIL).

The host I/F 132 may include direct memory access (DMA) that controls the transmission and reception of data between the host 102 and the memory 144. In an embodiment, the host I/F 132 may check current performance of the memory system 110 by monitoring the amount of data that are transmitted and received through the DMA.

The memory I/F 142 may serve as a memory/storage interface for interfacing between the controller 130 and the memory device 150 so that the controller 130 controls the memory device 150 in response to a request from the host 102. If the memory device 150 is flash memory, in particular, NAND flash memory, the memory I/F 142 may generate a control signal for the memory device 150, and may process data that is provided to the memory device 150 under the control of the main core 134. The memory I/F 142 may operate as an interface for processing a command and data between the controller 130 and the memory device 150, for example, a NAND flash interface.

The memory I/F 142 may drive firmware referred to as a flash interface layer (FIL).

The memory I/F 142 may include an error correction code (or error correction circuit, ECC). The ECC may detect and correct an error included in data that has been read from the memory device 150. That is, the ECC may perform an error correction decoding process on data that has been read from the memory device 150, through an ECC that has been used in an ECC encoding process. Based on a result of the error correction decoding process, the ECC may output a signal, such as an error correction success/fail signal, for example. When the number of error bits is greater than the threshold of a correctable error bit, the ECC may not correct the error bit, and may output the error correction fail signal.

The ECC may perform error correction by using a low density parity check (LDPC) code, a Bose, Chaudhuri, Hocquenghem (BCH) code, a turbo code, a Reed-Solomon code, a convolution code, a recursive systematic code (RSC), or coded modulation such as trellis-coded modulation (TCM) or block coded modulation (BCM). However, the ECC is not limited to such specific structures. The ECC may include all circuits, modules, systems, or devices for error correction.

The memory 144 may serve as an operating memory of the memory system 110 and the controller 130, and may store data for the driving of the memory system 110 and the controller 130. The controller 130 may control the memory device 150 in response to a request from the host 102 so that the memory device 150 may perform a read, program, or erase operation. The controller 130 may provide the host 102 with data that is read from the memory device 150, and may store, in the memory device 150, data that is provided by the host 102. The memory 144 may store data that is needed for the controller 130 and the memory device 150 to perform such operations.

The memory 144 may be implemented as a volatile memory, for example, a static random access memory (SRAM) or a dynamic random access memory (DRAM). The memory 144 may be disposed inside or outside the controller 130. In this case, the memory 144 is disposed within the controller 130. In an embodiment, the memory 144 may be implemented as an external volatile memory device having a memory I/F through which data are input/output between the memory 144 and the controller 130.

The memory 144 may include a background list 144_1 in which information with regard to one or more ZNSs on which a background operation needs to be performed through the main core 134 have been stored. Furthermore, the memory 144 may include a delay queue last output time information 144_2 of a read command that has been last output from the delay queue.

The main core 134 may control operations of the memory system 110. The main core 134 may drive firmware referred to as a flash translation layer (FTL) in order to control the operations of the memory system 110. Furthermore, the main core 134 may be implemented by using a micropro-cessor or a central processing unit (CPU), which include one or more processing cores.

The main core 134 may perform a foreground operation corresponding to a request that has been received from the host 102, by driving the FTL. For example, the main core 134 may control a write operation of the memory device 150 in response to a write request from the host 102, and may control a read operation of the memory device 150 in response to a read request from the host 102.

Furthermore, the main core 134 may perform a back-ground operation on the memory device 150. For example, the background operation for the memory device 150 may include a read reclaim operation, garbage collection, or wear leveling.

According to an embodiment of the present disclosure, the main core 134 may further include a command manager 160. The command manager 160 may determine a deterio-ration state of a ZNS, that is, a target for a read operation, in response to a read command that has been received from the host 102. As a result of the determination, if the ZNS corresponding to the read command is in the deterioration state, the main core 134 may sequentially input read com-mands to the delay queue. Furthermore, the main core 134 may calculate delay times for sequentially outputting the read commands stored in the delay queue whenever an internal timer is driven in a preset calculation time cycle, and may process the read commands by sequentially outputting the read commands from the delay queue after the calculated delay times. The main core 134 may determine the deterio-ration state of the ZNS by checking whether information of the ZNS corresponding to a read request has been included in the background list 144_1 included in the memory 144.

Figure 3:
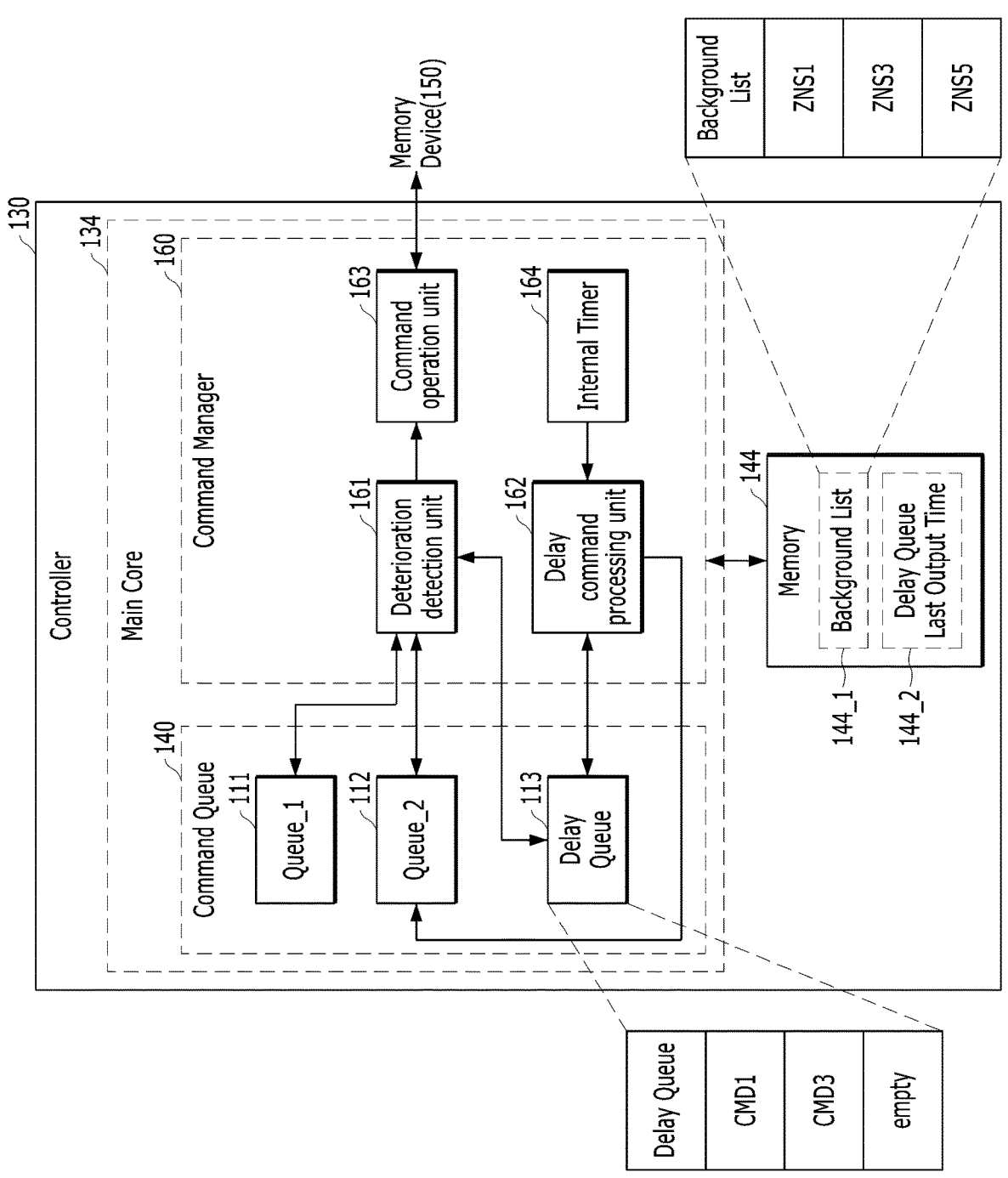
FIGS. 3 and 4 are detailed diagrams of the controller according to an embodiment of the present disclosure.
Figure 4:
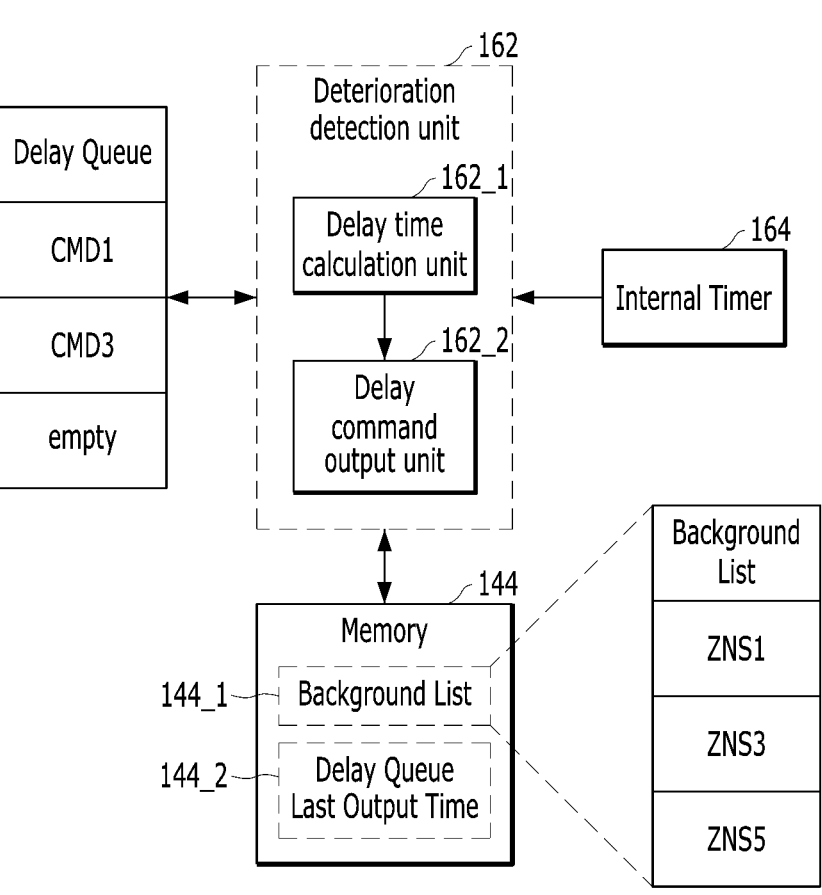

FIGS. 3 and 4 are detailed diagrams of the controller 130 according to an embodiment of the present disclosure.

Referring to FIG. 3, the main core 134 may include a command queue 140 and the command manager 160. Only components related to the present disclosure are shown in FIG. 3, for the illustrative purpose.

The command queue 140 may include a first command queue 111, a second command queue 112, and a delay queue 113.

The first command queue 111 may queue read commands CMD that have been received from the host 102. For example, the first command queue 111 may queue the read commands CMD from the host 102 in a received order or based on their priorities. Alternatively, the first command queue 111 may queue received read commands according to a predetermined algorithm. Furthermore, the first command queue 111 may provide the queued commands to a deterio-ration detection unit (i.e., deterioration detector or deterio-ration detection circuit) 161 included in the command man-ager 160, in a first-in first-out (FIFO) manner.

The second command queue 112 may queue read com-mands output from the delay queue 113 within the command manager 160. One or more read commands queued in the second command queue 112 are read commands, each of which a read operation needs to be performed on a sacrifice zone. Each of the read commands may be delayed by a delay time of each read command, which has been calculated by a delay command processing unit (i.e., delay command processor or delay command processing circuit) 162 within the command manager 160 to be described later, and may be output from the delay queue 113 through a command operation unit (i.e., command operator or command opera-tion circuit) 163. Furthermore, the second command queue

112 may provide the queued commands to the deterioration detection unit 161 included in the command manager 160, in the FIFO manner.

Furthermore, the read commands that have been queued in the first command queue 111 and the second command queue 112 may be transferred to the deterioration detection unit 161 in an alternating manner through two different inputs. That is, a read command may be transferred to the deterioration detection unit 161 through a first input corre-sponding to the first command queue 111. A read command may be transferred to the deterioration detection unit 161 through a second input corresponding to the second com-mand queue 112.

The command manager 160 may further include an inter-nal timer 164 in addition to the deterioration detection unit 161, the delay command processing unit 162, and the command operation unit 163.

The deterioration detection unit 161 may alternately receive read commands from the first command queue 111 and the second command queue 112.

The deterioration detection unit 161 may determine whether a read command that has been received from the first command queue 111 or the second command queue 112 corresponds to a read command that has been output from one of the first and second command queues. That is, when receiving a read command through a first input correspond-ing to the first command queue 111, the deterioration detec-tion unit 161 may determine that the received read command is a read command that has been output from the first command queue 111. Furthermore, when receiving a read command through a second input corresponding to the second command queue 112, the deterioration detection unit 161 may determine that the received read command has been output from the second command queue 112.

When receiving a read command from the first command queue 111, the deterioration detection unit 161 may check whether a ZNS corresponding to the read command corre-sponds to a sacrifice zone, that is, a target for a background operation. In this case, the sacrifice zone may indicate a zone on which a read reclaim operation is being performed or a zone on which a read reclaim needs to be performed. That is, when receiving the read command from the first com-mand queue 111, the deterioration detection unit 161 may check a ZNS corresponding to a read operation, in response to the read command. In a method of checking the ZNS corresponding to the read operation in response to the read command, a ZNS ID (or ZONE ID) may be included in information of the read command that has been received from the host 102. Accordingly, the deterioration detection unit 161 may check the ZNS corresponding to the read operation, in response to the read command. Furthermore, the deterioration detection unit 161 may check whether the checked ZNS corresponding to the read command is a ZNS, that is, a target for a read reclaim operation. In an embodi-ment of the present disclosure, the deterioration detection unit 161 may check whether the ZNS corresponding to the read command is included in the background list 144_1 included in the memory 144. Information of the ZNS, that is, the target for the read reclaim operation, may be stored in the background list 144_1. As a result of the check, when the ZNS corresponding to the read command is included in the background list 144_1, the deterioration detection unit 161 may sequentially input such read commands to the delay queue 113. The reason why the read commands are input to the delay queue 113 is for reducing the deterioration speed of a corresponding ZNS by delaying an operation of a corresponding read command because the ZNS corresponding to the read command is currently a target for a read reclaim operation. For example, if a ZNS, that is, a target for a read operation, is a first ZNS ZNS1 in response to a read command that has been received from the first command queue 111, the deterioration detection unit 161 may check whether the first ZNS ZNS1 has been included in the background list 144_1 included in the memory 144. The first ZNS ZNS1, a third ZNS ZNS3, and a fifth ZNS ZNS5 may be stored in the background list 144_1 included in the memory 144. Since the first ZNS ZNS1 is included in the background list 144_1 as a result of the check, the deterioration detection unit 161 may sequentially input corresponding read commands to the delay queue 113.

In contrast, if the ZNS corresponding to the read command is not included in the background list 144_1, the deterioration detection unit 161 may transfer the read command to the command operation unit 163.

For example, if read commands that have been queued in the first command queue 111 are a first read command and a fourth read command, the deterioration detection unit 161 may fetch the first read command to the fourth read command that have been queued in the first command queue 111, in the FIFO manner. First, the deterioration detection unit 161 may fetch the first read command that has been queued in the first command queue 111, and may check a ZNS corresponding to the first read command, that is, a target for a read operation, based on a ZNS ID included in the first read command. As a result of the check, if the ZNS corresponding to the first read command is the first ZNS ZNS1, the deterioration detection unit 161 may check whether the first ZNS ZNS1 is a target for a read reclaim operation by checking whether the first ZNS ZNS1 has been included in the background list 144_1 included in the memory 144. Since the first ZNS ZNS1 has been included in the background list 144_1 as a result of the check, the deterioration detection unit 161 may input the first read command to the delay queue 113.

The deterioration detection unit 161 may check a ZNS corresponding to the second read command that has been fetched from the first command queue 111. If the ZNS corresponding to the second read command is the second ZNS ZNS2 as a result of the check, the deterioration detection unit 161 may check whether the second ZNS ZNS2 has been included in the background list 144_1 included in the memory 144. Since the second ZNS ZNS2 has not been included in the background list 144_1 as a result of the check, the deterioration detection unit 161 may transfer the second read command to the command operation unit 163.

The deterioration detection unit 161 may check a ZNS corresponding to the third read command that has been fetched from the first command queue 111. If the ZNS corresponding to the third read command is the third ZNS ZNS3 as a result of the check, the deterioration detection unit 161 may check whether the ZNS is a ZNS, that is, a target for a read reclaim operation, by checking whether the third ZNS ZNS3 has been included in the background list 144_1 included in the memory 144. Since the third ZNS ZNS3 has been included in the background list 144_1 as a result of the check, the deterioration detection unit 161 may input the third read command to the delay queue 113.

The command operation unit 163 may read data from a ZNS within the memory device by performing a read operation in response to a read command that has been received from the deterioration detection unit 161.

The delay command processing unit 162 may calculate a delay time of a read command through a delay time calculation unit (i.e., delay time calculator or delay time calculation circuit) 162_1 whenever the internal timer 164 is driven in a preset calculation time cycle, and may input, to the second command queue 112, one or more read commands that have been queued in the delay queue 113 by selectively outputting the one or more read commands through a delay command output unit (i.e., delay command outputter or delay command output circuit) 162_2 based on the calculated delay time.

Specifically, referring to FIG. 4, whenever the internal timer is driven in each preset calculation time cycle, the delay time calculation unit 162_1 may calculate the number of read commands that have been queued in the delay queue 113, the number of sacrifice zones within the memory device, that is, a target for a read reclaim operation, and a delay time for outputting each of read commands that have been stored in the delay queue based on the timeout of the host 102. In this case, the internal timer 164 may be driven for each preset calculation time cycle in order to calculate the delay time of the read command that has been stored in the delay queue. For example, if the internal timer 164 has been set to 0.01 second, the delay time calculation unit 162_1 may be driven for each 0.01 second.

First, the delay time calculation unit 162_1 may check the number of sacrifice zones, that is, a target for a read reclaim operation, based on the background list 144_1 included in the memory 144. Furthermore, the delay time calculation unit 162_1 may calculate a total read reclaim operation time of one or more sacrifice zones, based on the checked number of sacrifice zones and a read reclaim average time of one sacrifice zone, which has been preset by the memory system. The total read reclaim operation time may indicate a total migration operation time that is taken to migrate valid data to one or more free zones in accordance with each of sacrifice zones included in the background list 144_1, that is, a target for one or more read reclaim operations. In an embodiment of the present disclosure, in calculating the total read reclaim operation time, a total number of sacrifice zones stored in the background list 144_1 have been used as the number of sacrifice zones, but the number of ZNSs corresponding to one or more read commands queued in the delay queue 113 may be used as the number of sacrifice zones.

Furthermore, the delay time calculation unit 162_1 may compare the calculated total read reclaim operation time and the timeout of the host 102. In this case, the reason why the total read reclaim operation time and the timeout of the host 102 are compared with each other is that the controller 130 has to process a command within the timeout of the host 102, that is, a preset limit time within which the host 102 expects to receive a response to the command from the memory system. If, as a result of the comparison between the calculated total read reclaim operation time and the timeout of the host 102, the total read reclaim operation time passes the timeout of the host 102, the delay time calculation unit 162_1 may calculate a delay time of one read command to be output from the delay queue 113 by dividing the timeout of the host 102 by the number of read commands that have been stored in the delay queue 113 because the controller 130 has to process the read command within the timeout of the host 102. Furthermore, the reason why the timeout of the host 102 is divided by the number of read commands that have been queued in the delay queue 113 is that if a plurality of read commands is simultaneously input to the delay queue 113, the controller 130 has to process the simultaneously input read commands prior to the timeout of the host 102.

In contrast, if, as a result of the comparison between the calculated total read reclaim operation time and the timeout of the host 102, the total read reclaim operation time has not passed the timeout of the host 102, the delay time calculation unit 162_1 may calculate a delay time of one read command to be output from the delay queue 113 by dividing the total read reclaim operation time by the number of read commands that have been stored in the delay queue 113.

For example, if the number of sacrifice zones that have been stored in the background list 144_1 is 3 and a preset read reclaim average time of one sacrifice zone is 2 seconds, a total read reclaim operation time of the sacrifice zones may be 6 seconds. Furthermore, if the timeout of the host 102 is 4 seconds, the total read reclaim operation time passes the timeout of the host 102. Thus, a delay time of one read command may be 2 seconds by dividing 4 seconds, that is, the timeout of the host 102, by 2 that is the number of read commands that have been queued in the delay queue.

The delay command output unit 162_2 may input one read command to the second command queue 112 by selectively outputting the read command from the delay queue 113, based on a delay time of the one read command that has been calculated by the delay time calculation unit 162_1. Specifically, the delay command output unit 162_2 may check an output time of a read command that has been finally output from the delay queue 113, based on the last output time of the read command from the delay queue 113, which has been stored in the memory. Furthermore, the delay command output unit 162_2 may check whether a difference between a current time and the last output time of the read command from the delay queue 113 is greater than the delay time of the one read command. If, as a result of the check, the difference between the current time and the last output time of the read command from the delay queue 113 is greater than the delay time of the one read command, the delay command output unit 162_2 may input one read command to the second command queue 112 by outputting the read command from the delay queue 113. In contrast, if, as a result of the check, the difference between the current time and the last output time of the read command from the delay queue 113 is the delay time of the one read command or less, the delay command output unit 162_2 may input one read command to the second command queue 112 by outputting the read command from the delay queue 113 at a time that has elapsed from the last output time of the read command from the delay queue 113 by a delay time of the one read command that has been calculated by the delay time calculation unit 162_1. Furthermore, in an embodiment of the present disclosure, a FIFO manner may be applied to a method of inputting/outputting a read command from the delay queue 113. That is, a read command that has been input for the first time, among one or more read commands that have been stored in the delay queue 113, may be delayed by a calculated delay time and output from the delay queue 113. Furthermore, after inputting the read command to the second command queue 112, the delay command output unit 162_2 may update, with a current time, the last output time of the read command from the delay queue 113 that has been stored in the memory when the read command is output from the delay queue 113.

For example, if the last output time of the read command from the delay queue 113, which has been stored in the memory, is 9:00:00 and a current time is 9:00:01, the delay command output unit 162_2 may input one read command to the second command queue 112 by outputting the one read command from the delay queue 113 at 9:00:02 that has elapsed from 9:00:00, that is, the last output time of the read command from the delay queue 113, by 2 seconds because a difference between the current time and the last output time of the read command from the delay queue 113 has not passed 2 seconds, that is, a calculated delay time. Furthermore, the delay command output unit 162_2 may update the last output time of the read command from the delay queue 113 with 9:00:02.

The deterioration detection unit 161 may receive read commands from the first command queue 111 and the second command queue 112 in the alternating manner as described above. In particular, the deterioration detection unit 161 may check whether a ZNS corresponding to only the read command that has been output from the first command queue 111 corresponds to a sacrifice zone, and may immediately transfer, to the command operation unit 163, the read command that has been output from the second command queue 112. For example, after fetching the read command that has been queued in the first command queue 111, the deterioration detection unit 161 may check whether a read command is present in the second command queue 112. Furthermore, since a first read command has been queued in the second command queue 112, the deterioration detection unit 161 may fetch the first read command and immediately transfer the fetched first read command to the command operation unit 163.

FIGS. 5 to 9 are flowcharts for describing operations of the controller 130 according to an embodiment of the present disclosure.

Figure 5:
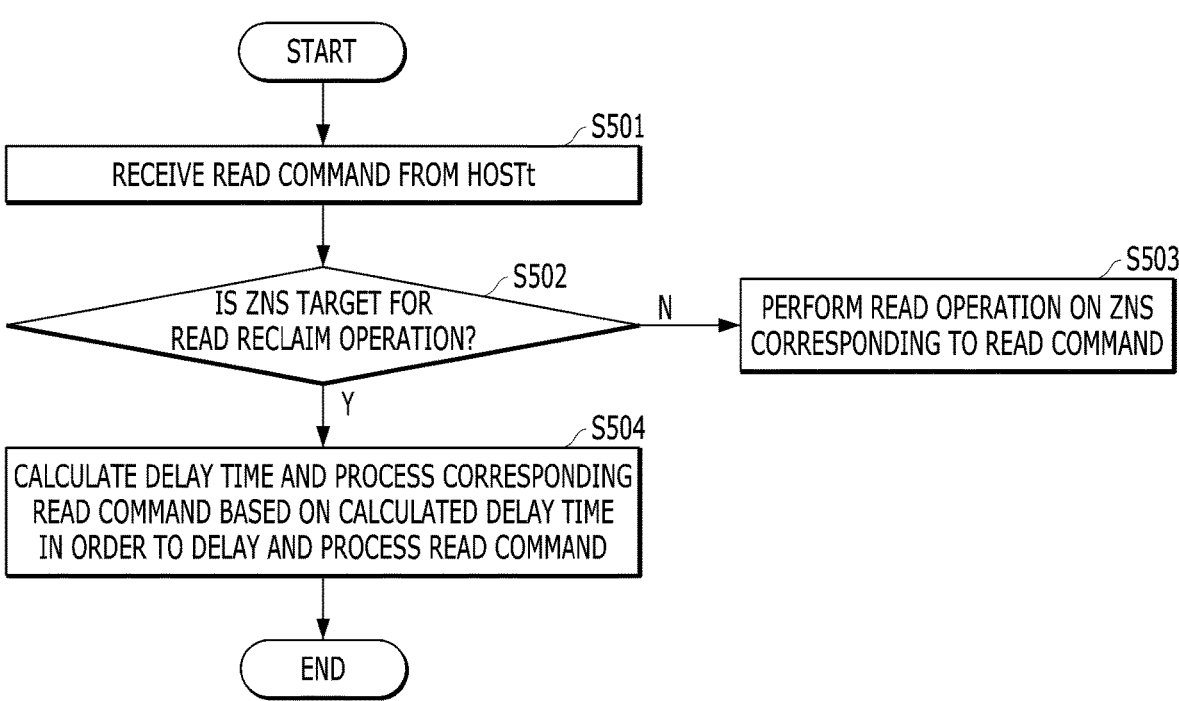

Referring to FIG. 5, in operations S501 and S502, the command manager 160 may check whether a ZNS corresponding to a read command that has been received from the host 102 is a target for a read reclaim operation. This is described in detail with reference to FIG. 6.

If, as a result of the check, the ZNS corresponding to the read command is not the target for the read reclaim operation ('N' in the operation S502), the command manager 160 may perform a read operation on the ZNS corresponding to the read command (operation S503).

In contrast, if, as a result of the check, the ZNS corresponding to the corresponding read command is the target for the read reclaim operation ('Y' in the operation S502), the command manager 160 may calculate a delay time corresponding to the read command in order to delay the deterioration speed of the ZNS, that is, the target for the read reclaim operation, and may selectively process the read command based on the calculated delay time (operation S504).

Figure 6:
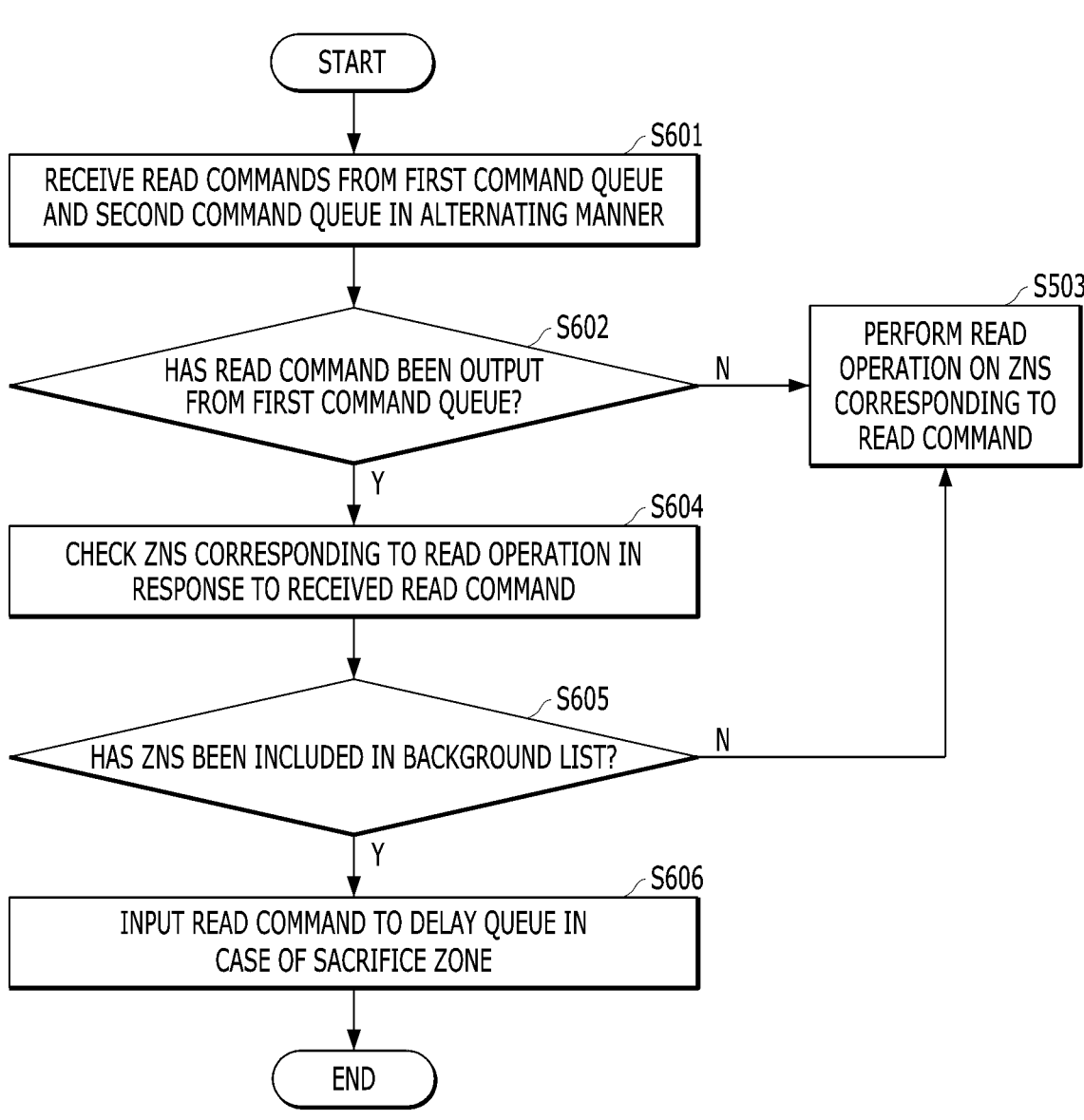

FIG. 6 specifically describes the operations S501 and S502 in FIG. 5 according to an embodiment of the present disclosure.

Referring to FIG. 6, in operation S601, the command manager 160 may receive read commands from the first command queue 111 and the second command queue 112 in the alternating manner.

In operation S602, the command manager 160 may check from which command queue the read command has been output between the first command queue 111 and the second command queue 112. That is, if the read command is received through a first input corresponding to the first command queue 111, the command manager 160 may determine that the read command is a read command that has been output from the first command queue 111. Furthermore, if the read command is received through a second input corresponding to the second command queue 112, the command manager 160 may determine that the read command is a read command that has been output from the second command queue 112.

If, as a result of the check, the read command that has been output from the first command queue 111 is not received ('N' in the operation S602), that is, if the read command that has been output from the second command queue 112 is received through the second input, in operation S603, the command manager 160 may perform a read operation on a ZNS corresponding to the received read command in response to the read command (i.e., perform the operation S503 in FIG. 5) without checking whether the ZNS is a target for a read reclaim operation. In this case, the reason why it is not checked whether the ZNS corresponding to the read command is the target for the read reclaim operation is that the read command that is output from the second command queue 112 is a read command that has already been delayed based on a delay time.

In contrast, if, as a result of the check, the read command that has been output from the first command queue 111 through the first input is received ('Y' in the operation S602), the command manager 160 may check a ZNS corresponding to a read operation in response to the received read command (operation S604) in order to check whether the ZNS corresponding to the read command is a target for a read reclaim operation. Specifically, when receiving the read command from the first command queue 111, the command manager 160 may check the ZNS corresponding to the read command based on a ZNS ID included in the read command.

In operation S605, in order to check whether the ZNS corresponding to the read command corresponds to a sacrifice zone, that is, a target for a background operation, the command manager 160 may check whether the ZNS corresponding to the read command has been included in the background list 144_1 included in the memory 144. In this case, information of a ZNS on which a read reclaim operation is being performed or a ZNS on which a read reclaim operation needs to be performed may be stored in the background list 144_1.

If, as a result of the check, the ZNS corresponding to the read command has been included in the background list 144_1 ('Y' in the operation S605), the command manager 160 may determine that the ZNS corresponding to the read command is a target for a read reclaim operation, and may sequentially input such read commands to the delay queue 113 (operation S606). The reason why the read command is input to the delay queue 113 is for reducing the deterioration speed of the ZNS by delaying an operation of the read command because the ZNS corresponding to the read command is currently a target for a read reclaim operation.

In contrast, if, as a result of the check, the ZNS corresponding to the read command has not been included in the background list 144_1 ('N' in the operation S605), the command manager 160 may perform a read operation on the ZNS corresponding to the read command through operation S503 (i.e., proceed to the operation S603).

Figure 7:
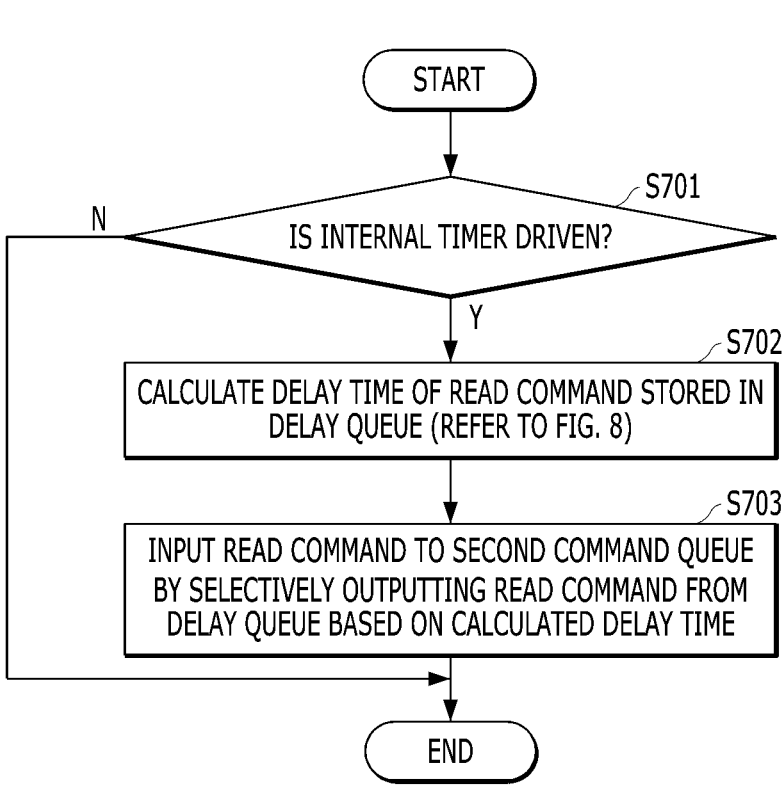

FIG. 7 specifically describes the operation S504 in FIG. 5 according to an embodiment of the present disclosure.

Referring to FIG. 7, in operations S701 and S702, whenever the internal timer 164 is driven in a preset calculation time cycle, the command manager 160 may calculate a delay time of a read command for outputting the read command that has been stored in the delay queue, based on the number of read commands that have been queued in the delay queue 113, the number of sacrifice zones, that is, a target for a read reclaim operation, within the memory device, and the timeout of the host 102. A method of the calculation is described in detail with reference to FIG. 8.

In operation S703, the command manager 160 may input one read command to the second command queue 112 by selectively outputting the read command from the delay queue 113 based on the calculated delay time of the read command. This is described in detail with reference to FIG. 9.

FIG. 8 specifically describes the operations S701 and S702 in FIG. 7 according to an embodiment of the present disclosure.

Referring to FIG. 8, whenever the internal timer 164 is driven in a preset calculation time cycle, the command manager 160 may calculate a delay time of a read command based on the number of read commands that have been queued in the delay queue 113, the number of sacrifice zones, that is, a target for a read reclaim operation, within the memory device, and the timeout of the host 102.

First, in operation S801, the command manager 160 may check the number of sacrifice zones, that is, a target for a read reclaim operation, based on the background list 144_1 included in the memory 144.

In operation S802, the command manager 160 may calculate a total read reclaim operation time of one or more sacrifice zones, based on the checked number of sacrifice zones and a read reclaim average time of one sacrifice zone that has been preset by the memory system. The total read reclaim operation time may indicate a total migration operation time that is taken to migrate valid data that has been included in the one or more sacrifice zones included in the background list 144_1, that is, a target for a read reclaim operation, to a free zone. In an embodiment of the present disclosure, in calculating the total read reclaim operation time, a total number of sacrifice zones that have been stored in the background list 144_1 has been used as the number of sacrifice zones, but the number of ZNSs corresponding to one or more read commands that have been queued in the delay queue 113 may be used as the number of sacrifice zones.

In operations S803 and S804, the command manager 160 may compare the calculated total read reclaim operation time and the timeout of the host 102. In this case, the reason why the total read reclaim operation time and the timeout of the host 102 are compared is that the controller 130 has to process a command within the timeout of the host 102, that is, a preset limit time within which the host 102 expects to receive a response to the command from the memory system.

If, as a result of the comparison between the calculated total read reclaim operation time and the timeout of the host 102, the total read reclaim operation time has passed the timeout of the host 102 ('Y' in the operation S804), the command manager 160 may calculate a delay time of one read command to be output from the delay queue 113 by dividing the timeout of the host 102 by the number of read commands that have been stored in the delay queue 113 because the controller 130 has to process the command within the timeout of the host 102 (operation S805). Furthermore, the reason why the timeout of the host 102 is divided by the number of read commands that have been queued in the delay queue 113 is that if a plurality of read commands is simultaneously input to the delay queue 113, the controller 130 has to process the simultaneously input read commands prior to the timeout of the host 102.

In contrast, if, as a result of the comparison between the calculated total read reclaim operation time and the timeout of the host 102, the total read reclaim operation time has not passed the timeout of the host 102 ('N' in the operation S804), the command manager 160 may calculate a delay time of one read command to be output from the delay queue 113 by dividing the total read reclaim operation time by the number of read commands that have been stored in the delay queue 113 (operation S806).

Figure 9:
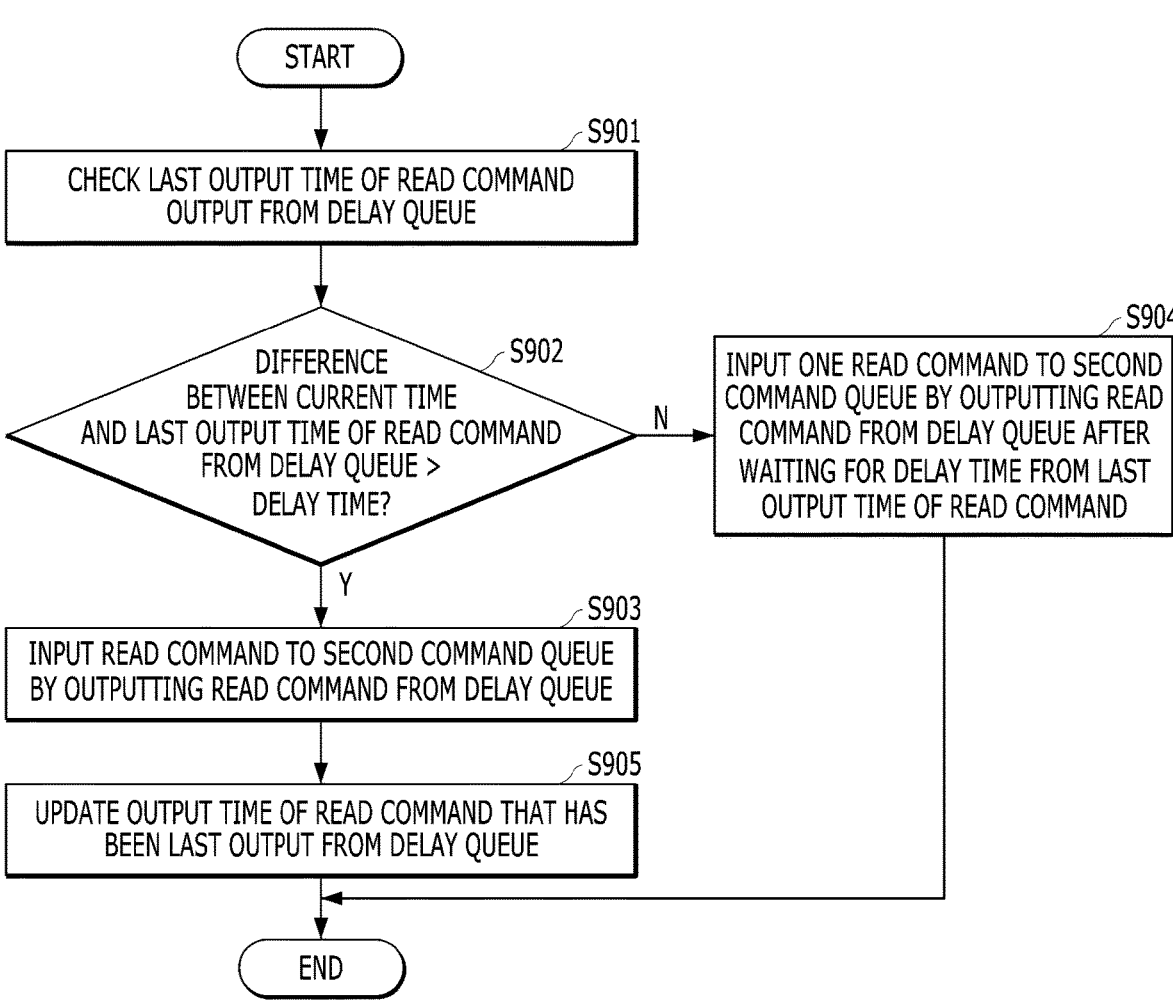

FIG. 9 specifically describes the operation S703 in FIG. 7 according to an embodiment of the present disclosure.

Referring to FIG. 9, in operation S901, the command manager 160 may check an output time of a read command that has been finally output from the delay queue 113. The output time of the read command that has been finally output from the delay queue 113 may be checked based on the last output time of the read command from the delay queue 113, which has been stored in the memory.

In operation S902, the command manager 160 may check whether a difference between a current time and the last output time of the read command from the delay queue 113 is greater than a calculated delay time.

If, as a result of the check, the difference between the current time and the last output time of the read command from the delay queue 113 is greater than the calculated delay time ('Y' in the operation S902), the command manager 160 may input, to the second command queue 112, one read command that has been received from the delay queue 113 for the first time by immediately outputting the one read command (operation S903).

In contrast, if, as a result of the check, the difference between the current time and the last output time of the read command from the delay queue 113 is the calculated delay time or less ('N' in the operation S902), the command manager 160 may wait for the calculated delay time from the last output time of the read command from the delay queue 113, and may then input one read command to the second command queue 112 by outputting the one read command from the delay queue 113 (operation S904). Furthermore, in an embodiment of the present disclosure, the FIFO method may be applied to a method of inputting/outputting a read command to/from the delay queue 113. That is, the command manager 160 may output a read command that has been received for the first time, among one or more read commands that have been stored in the delay queue 113, from the delay queue 113 by delaying the read command by the calculated delay time.

In operation S905, after inputting the read command to the second command queue 112, the command manager 160 may update, with a current time, the last output time of the read command from the delay queue 113, which has been stored in the memory, when the read command is output from the delay queue 113.

Although the detailed embodiments have been described in the detailed description of the present disclosure, the present disclosure may be modified in various ways without departing from the scope of the present disclosure. Accordingly, the scope of the present disclosure should not be limited to the aforementioned embodiments, but should be defined by not only the claims, but equivalents thereof.

Meanwhile, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory system comprising:
   a memory device including a plurality of memory blocks allocated to a plurality of zoned namespaces (ZNSs); and
   a controller configured to, when a ZNS on which a read command received from a host is to be performed is a target for a background operation in which a data migration occurs, store the read command in a delay queue, calculate a delay time for each of read commands stored in the delay queue for each preset calculation time cycle, and sequentially output the read commands from the delay queue after a delay of the calculated delay time to process the read commands,
   wherein the controller is configured to:
   input a read command to a first command queue when receiving the read command from the host,
   input, to a second command queue, the read command output from the delay queue based on the delay time, and
   alternately output the read commands stored in the first command queue and the second command queue.

2. The memory system of claim 1, wherein the controller is configured to:
   store, in the delay queue, the read command output from the first command queue when a ZNS corresponding to the read command is a ZNS that is the target for the background operation, and
   transfer data to the host by performing a read operation on the ZNS corresponding to the read command when the ZNS corresponding to the read command output from the first command queue is not the ZNS that is the target for the background operation.

3. The memory system of claim 2, wherein the controller is configured to calculate the delay time of the read command, based on a total background operation time of one or more ZNSs each ZNS corresponding to the target for the background operation, a timeout of the host for the read command, and the number of read commands stored in the delay queue, for each preset calculation time.

4. The memory system of claim 3, wherein the total background operation time of the ZNS that is the target for the background operation is calculated based on a total number of ZNSs and a preset background operation average time of one ZNS, after checking the total number of ZNSs each corresponding to the target for the background operation, based on a background list storing information of a ZNS on which the background operation is to be performed or on which the background operation is being performed.

5. The memory system of claim 4, wherein the controller is configured to:
   compare the calculated total background operation time and the timeout of the host, and
   calculate the delay time of the read command stored in the delay queue by dividing the timeout of the host by the number of read commands stored in the delay queue to process the read command stored in the delay queue within the timeout of the host when the total background operation time is greater than the timeout of the host.

6. The memory system of claim 4, wherein the controller is configured to:
   compare the calculated total background operation time and the timeout of the host, and calculate the delay time of the read command stored in the delay queue by dividing the total background operation time by the number of read commands stored in the delay queue when the total background operation time is the timeout of the host or less.

7. The memory system of claim 3, wherein the controller is configured to:

check whether a difference between a current time and an output time of a previous read command is greater than the calculated delay time by checking the output time of the previous read command in the delay queue, and input one read command to the second command queue by outputting the one read command from the delay queue if, as a result of the check, the difference between the current time and the output time of the previous read command is greater than the calculated delay time, and input one read command to the second command queue by outputting the one read command from the delay queue when the delay time elapses from the checked output time of the previous read command if, as a result of the check, the difference between the current time and the output time of the previous read command is the calculated delay time or less.

8. The memory system of claim 7, wherein the controller is configured to transfer data to the host by outputting the read command input to the second command queue and by performing a read operation on a ZNS corresponding to the read command.

9. The memory system of claim 1, wherein the background operation includes a read reclaim operation.

10. An operating method of a memory system, the operating method comprising:

receiving a read command from a host;

checking a zoned namespace (ZNS) corresponding to a read operation in response to the received read command;

checking whether the checked ZNS is a sacrifice ZNS corresponding to a target for a background operation;

storing the read command in a delay queue when the ZNS is the sacrifice ZNS;

calculating a delay time of each of the read commands stored in the delay queue for each preset calculation time; and processing the read command after delaying the read command based on the calculated delay time, and further comprising:

inputting the read command to a first command queue when receiving the read command from the host, inputting, to a second command queue, the read command output from the delay queue based on the delay time, and alternately outputting the read commands stored in the first command queue and the second command queue.

11. The operating method of claim 10, wherein in the calculating of the delay time, the delay time of the read command is calculated based on the number of read commands stored in the delay queue, a total background operation time of ZNSs each ZNS corresponding to the target for the background operation, and a timeout of the host, for each preset calculation time.

12. The operating method of claim 11, wherein the total background operation time of the ZNS corresponding to the sacrifice ZNS is calculated based on a total number of ZNSs and a preset background operation average time of one ZNS, after checking the total number of ZNSs each ZNS corresponding to the sacrifice ZNS, based on a background list storing information of a ZNS on which the background operation is to be performed or on which the background operation is being performed.

13. The operating method of claim 12, wherein the delay time of the read command stored in the delay queue is calculated by comparing the calculated total background operation time and the timeout of the host and by dividing the timeout of the host by the number of read commands stored in the delay queue to process the read command stored in the delay queue within the timeout of the host when the total background operation time is greater than the timeout of the host.

14. The operating method of claim 12, wherein the delay time of the read command stored in the delay queue is calculated by comparing the calculated total background operation time and the timeout of the host and by dividing the total background operation time by the number of read commands stored in the delay queue when the total background operation time is the timeout of the host or less.

15. The operating method of claim 10, wherein the processing of the read command comprises:

checking an output time of a previous read command in the delay queue;

checking whether a difference between a current time and an output time of a previous read command in the delay queue is greater than the calculated delay time;

outputting one read command from the delay queue if, as a result of the check, the difference between the current time and the output time of the previous read command in the delay queue is greater than the calculated delay time;

outputting one read command from the delay queue when the delay time elapses from the checked output time of the previous read command if, as a result of the check, the difference between the current time and the output time of the previous read command in the delay queue is the calculated delay time or less; and performing a read operation on a ZNS corresponding to the output read command.

16. The operating method of claim 10, wherein the background operation includes a read reclaim operation.

17. The operating method of claim 10, wherein in the checking of whether the checked ZNS is the sacrifice ZNS, when the checked ZNS is not the sacrifice ZNS, data is transferred to the host by performing a read operation on the ZNS corresponding to the read command.

18. The memory system of claim 1, wherein each of the plurality of ZNSs is a zone for storing data corresponding to continuous logical addresses provided by the host.

19. The memory system of claim 10, wherein each of the plurality of ZNSs is a zone for storing data corresponding to continuous logical addresses provided by the host.

* * * * *